United States Patent

Beuk et al.

[15] 3,636,434
[45] Jan. 18, 1972

[54] VOLTAGE REGULATOR FOR PERMANENT MAGNET ALTERNATORS

[72] Inventors: Ljubomir Beuk, Chicago; Robert Vargas, Arlington Heights, both of Ill.

[73] Assignee: Motorola, Inc., Franklin Park, Ill.

[22] Filed: Nov. 4, 1970

[21] Appl. No.: 86,747

[52] U.S. Cl....................................322/28, 321/18, 322/36, 322/94
[51] Int. Cl..........................................H02p 9/00, H02m 7/22
[58] Field of Search......................322/28, 36, 89, 90, 91, 93, 322/94; 321/16, 18

[56] References Cited

UNITED STATES PATENTS 3,439,253  4/1969  Piteo.............................................321/18
3,524,123  8/1970  Williams et al. ......................322/91 X
3,448,368  6/1969  Brouwer.................................321/18

Primary Examiner—Lewis H. Myers
Assistant Examiner—H. Huberfeld
Attorney—Mueller and Aichele

[57] ABSTRACT

A voltage regulator having silicon controlled rectifiers connecting opposite ends of the output winding of an alternator to a voltage utilization circuit connected to the output terminal of the voltage regulator. The voltage regulator utilizes the voltage difference between the gate cathode circuit of the silicon controlled rectifiers to establish a reference current conducting point at which the silicon controlled rectifiers will be rendered conductive.

7 Claims, 2 Drawing Figures

PATENTED JAN 18 1972

3,636,434

INVENTORS.
LJUBOMIR BEUK
ROBERT VARGAS
BY Mueller & Aichele
ATTORNEYS.

3,636,434

VOLTAGE REGULATOR FOR PERMANENT MAGNET ALTERNATORS

BACKGROUND OF THE INVENTION

This invention relates generally to a voltage regulator circuit, and more particularly, to a regulator circuit for controlling the output of an alternator.

Dynamoelectric machines, such as generators or alternators, are used to supply power to electrical components on vehicles, and are used to supply charging current to batteries of such vehicles. One such voltage regulator circuit of the prior art incorporates a single current control device connected in series between the output of a dynamoelectric machine and the voltage utilization means, this being a battery, or the like. However, in this prior arrangement it is difficult to obtain full wave voltage regulation because of the inherent delay in recovery time of a silicon controlled rectifier from its full conductive condition to its full off condition. That is, the silicon controlled rectifier cannot be turned off fast enough and will still be conducting at the beginning of the next cycle even if the gate voltage is removed. Full wave rectification can be accomplished only with great difficulty and expense and with substantial complexity to overcome this problem.

SUMMARY OF THE INVENTION

Therefore, an object of this invention is to provide an improved voltage regulator for permanent magnet alternators which is efficient and reliable in operation, and simple and inexpensive to manufacture.

Briefly, the voltage regulator circuit of this invention utilizes an output winding of an alternating voltage source, such as a dynamoelectric machine, or the like, with silicon controlled rectifiers connected in circuit with the output winding and tied together at their cathodes to form a common output terminal for connection to the voltage utilization means. A reference voltage may be supplied, either by a zener diode or by a transistor control circuit, to control the firing potential at the gate electrodes of both of the silicon controlled rectifiers. The gate electrodes of the silicon controlled rectifiers are coupled to the reference voltage through isolating diodes which allow the rectifiers to conduct during respective different half-cycles of alternating current voltage under the control of a single reference voltage source.

DESCRIPTION OF THE PREFERRED EMBODIMENT

Figure 1:
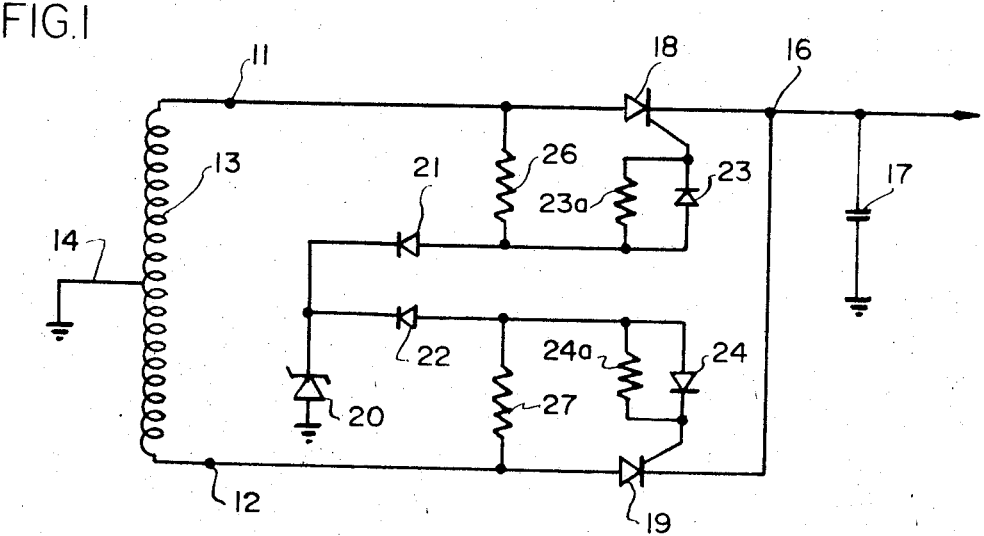
FIG. 1 illustrates a schematic diagram of a simplified form of a voltage regulator circuit.

Referring first to FIG. 1, there is seen a voltage regulator circuit designated generally by reference numeral 10. The voltage regulator circuit 10 has a pair of input terminals 11 and 12 arranged for connection to opposite ends of the output winding 13 of a dynamoelectric machine. The center tap of winding 13 is connected to ground potential through a line 14, in a well-known manner. An output terminal 16 is provided to receive half-wave pulses of a given polarity which charge a capacitor 17 to a predetermined voltage value, this being, for example, in the order of 12 to 14 volts, more or less. The capacitor 17 may be a relatively large capacitor, in the order of 1,000 microfarads or so, to provide a substantial amount of filtering. A pair of silicon controlled rectifiers 18 and 19 are connected in series with the input terminals 11 and 12, respectively, and each has its cathode connected to the output terminal 16. Thus, controlled amounts of current are delivered to the capacitor 17 by controlling the periods of conduction of the silicon controlled rectifiers.

A zener diode 20 supplies a given reference voltage to the gate electrodes of the silicon controlled rectifiers 18 and 19 during voltage regulation operation of the circuit. However, to utilize a single reference voltage source isolation diodes 21 and 22 are provided with their cathodes connected together and to the zener diode 20, and their anodes connected, respectively, to the base electrodes of silicon controlled rectifiers 18 and 19, this being accomplished through respective diodes 23 and 24. The forward voltage drop of diodes 23 and 24, together with the gate cathode voltage drop of the respective silicon controlled rectifiers 18 and 19, determine the relative reference voltage required of zener diode 20 and the diodes 21 and 22 with respect to the voltage charge which will appear across capacitor 17. To prevent silicon controlled rectifier 18 and 19 from locking on due to overheating, resistors 23a and 24a are connected in parallel with diodes 23 and 24, respectively.

Voltage from each half-cycle of alternating current voltage appearing at the input terminals 11 and 12 is applied to the zener diode 20 via a pair of resistors 26 and 27 and the corresponding series connected isolation diodes 21 and 22.

Since each silicon controlled rectifier 18 and 19 operates only for a given half-cycle of applied alternating current voltage, there is no problem of commutating the respective silicon controlled rectifiers to a nonconductive condition after a given half-cycle of conduction. This is because each silicon controlled rectifier is commutated off while the other is rendered conductive, and vice versa.

Figure 2:
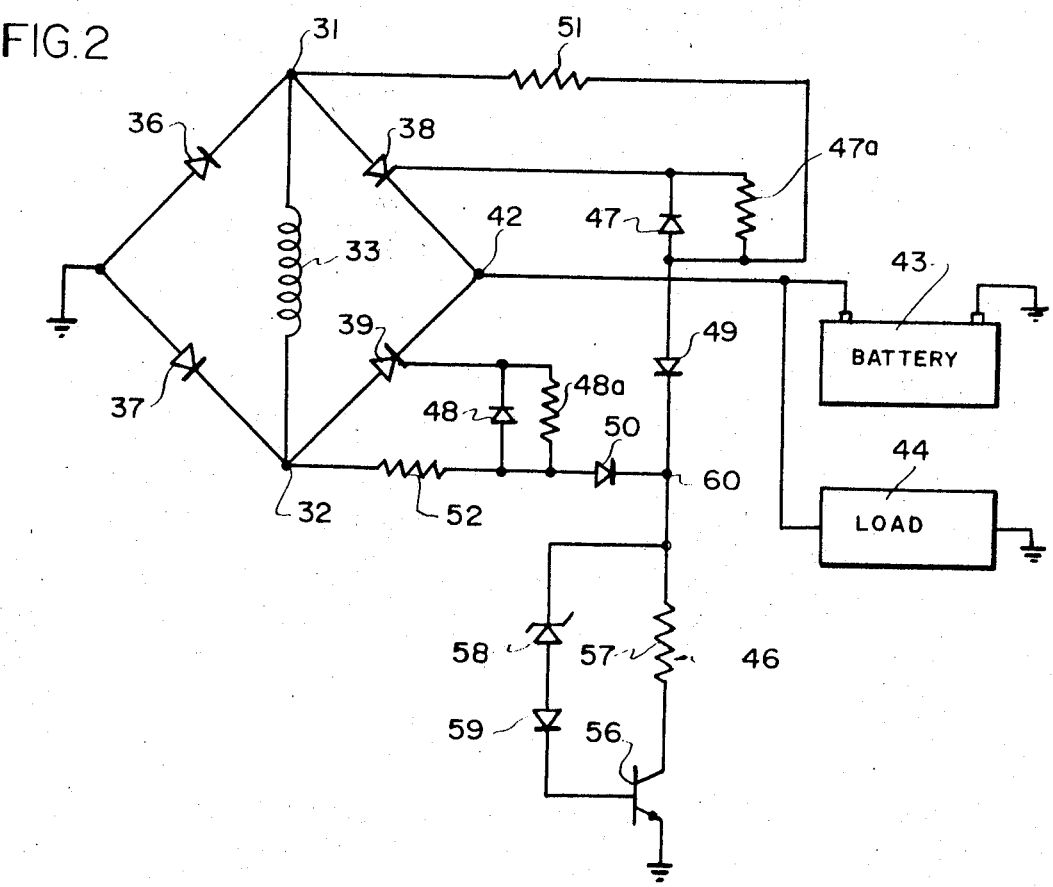
FIG. 2 illustrates the preferred embodiment of the voltage regulator circuit of this invention.

Referring now to FIG. 2, there is seen an alternate form of the voltage regulator circuit constructed in accordance with this invention and is here designated generally by reference numeral 30. A pair of input terminals 31 and 32 are provided for receiving an output winding 33 of a dynamoelectric machine, such as an alternator or the like. A pair of silicon controlled rectifiers 38 and 39 and a pair of diodes 36 and 37 are connected in a bridge circuit arrangement with the input terminals being formed at the cathode-anode junction of the diode 36 and the silicon controlled rectifier 38, and the diode 37 and the silicon controlled rectifier 39. The DC connection of the bridge circuit is obtained by connecting the anodes of diodes 36 and 37 to ground potential and the cathodes of silicon controlled rectifiers 38 and 39 to an output terminal 42. In this instance, the current utilization means is here illustrated as a battery 43 which receives charging current and a resistive load 44 connected in parallel therewith.

The gate electrodes of silicon controlled rectifiers 38 and 39 are coupled to a reference voltage source indicated generally by reference numeral 46 through diodes 47 and 48 connected in parallel with resistors 47a and 48a and isolation diodes 49 and 50, respectively. The reference voltage source 46 is a high-current load reference source as compared to the zener diode 20 of FIG. 1. Operating voltage is applied to the reference source 46 and to the gate electrodes of silicon controlled rectifiers 38 and 39 through a pair of resistors 51 and 52 which are connected to the respective input terminals 31 and 32.

The high-current reference voltage circuit 46 comprises a transistor 56 having its emitter-collector electrodes connected in series with a resistor 57. The resistor 57, together with the collector-base junction of transistor 56, is shunted by a zener diode 58 which, in turn, is connected in series with a diode 59. This circuit provides a substantially constant voltage at a circuit point 60 which is utilized as the reference voltage point with respect to the output terminal 42. The voltage difference between these two circuit points will determine the relative conduction of the silicon controlled rectifier in the bridge circuit. For example, where the battery 43 is a 12-volt automobile battery, the reference voltage at the circuit point 60 is selected to cause a full output of the voltage regulator circuit 31 when a heavy load is connected across the battery or when the battery is in need of a charge. During this condition the normal voltage increase at the battery 43 may be in the order of 13.5 to 14 volts. This increase in voltage is insufficient to cause output current to cease flowing from the voltage regulator 30, but which may be sufficient only to reduce current flow from the voltage regulator 30. However, if a further increase in voltage appears at the output terminal 42, i.e., in the order of 14.2 volts or more, the reverse bias condition on the gate cathode juncture of each of the silicon controlled rectifiers 38 and 39 will cause a complete termination of current from the voltage regulator 30.

Accordingly, the voltage regulator circuit of this invention provides means whereby output voltage can be effectively regulated during each half-cycle of alternating current voltage at the output of a dynamoelectric machine. It will be understood that variations and modifications of this invention may be effected without departing from the spirit and scope of the normal concepts disclosed and claimed herein.

We claim:

1. A voltage regulator circuit for connection across the output winding of a dynamoelectric machine which develops alternating current voltage with opposite polarity half-cycles appearing at the end of said output winding, comprising:

a pair of input terminals and an output terminal, said input terminals arranged for connection to the opposite ends of the output winding of the dynamoelectric machine, and said output terminal arranged for connection to a load;

a first current control device having load electrodes connected between one of said pair of input terminals and said output terminal and having a control electrode to selectively cause conduction of said first current control device when half-cycles of a given polarity are applied to said one input terminal;

a second current control device having load electrodes connected between the other of said pair of input terminals and output terminals, and having a control electrode to selectively cause conduction of said second current control device when half-cycles of a given polarity are applied to said other input terminal;

a reference voltage source having a voltage value proportional to the voltage value desired at the output terminal of the voltage regulator circuit;

a diode connected from each of said pair of input terminals to said reference voltage source to deliver unidirectional current to said reference voltage source;

circuit means coupling said control electrodes of said first and second current control devices to said diodes to maintain said control electrode at a fixed voltage value corresponding to said reference voltage source; and utilization means coupled to said output terminal to develop the output voltage of the voltage regulator circuit, and when said output voltage is below a selected predetermined value corresponding to the value of said reference voltage source, it will cause said first and second current control devices alternately to be rendered conductive in response to alternate half-cycles of said given polarity at said input terminals, and when said output voltage source is above said selected predetermined value, it will disable said first and second current control devices to prevent current flow from said input terminals to said output terminals.

2. The voltage regulator circuit of claim 1 wherein said reference voltage source includes a single zener diode, first and second resistors connected at opposite ends of said output winding, and in series with the respective diodes connected with said single zener diode.

3. The voltage regulator circuit of claim 1 including first and second diodes connected in series with the respective first and second control electrodes of said first and second current control devices.

4. The voltage regulator circuit of claim 1 including first and second resistors connected in parallel with said first and second diodes, respectively, to prevent said first and second current control devices from locking on due to overheating.

5. The voltage regulator circuit of claim 1 wherein said output voltage is developed across a capacitor connected to the output terminal of said voltage regulator circuit.

6. The voltage regulator circuit of claim 1 wherein said second reference potential is developed by means of a battery connected to the output terminal of said voltage regulator circuit.

7. The voltage regulator circuit of claim 1 wherein said first reference voltage is developed by a circuit including a transistor having collector-emitter electrodes connected in series with a resistor which, in turn, is coupled to the control electrodes of said first and second current control devices, and a zener diode coupled across said resistor and the base electrode of said transistor to cause constant voltage to be sensed at the control electrodes of said first and second current control device.

* * * * *